(12) United States Patent
Takashiba et al.

(10) Patent No.: US 6,598,583 B2
(45) Date of Patent: Jul. 29, 2003

(54) GASOLINE DIRECT INJECTION ENGINE

(75) Inventors: Kazuhiro Takashiba, Wako (JP); Naoaki Takeda, Wako (JP); Yutaka Kohda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 31 days.

(21) Appl. No.: 09/953,548

(22) Filed: Sep. 17, 2001

(65) Prior Publication Data

US 2002/0033163 A1 Mar. 21, 2002

(30) Foreign Application Priority Data

Sep. 19, 2000 (JP) ......................................... 2000-283328

(51) Int. Cl.[7] .............................................. F02B 17/00
(52) U.S. Cl. ...................... 123/295; 123/301; 123/305
(58) Field of Search ................................. 123/295, 305, 123/294, 429, 430, 301

(56) References Cited

U.S. PATENT DOCUMENTS

| | | | | |
|---|---|---|---|---|
| 6,035,822 A | * | 3/2000 | Suzuki et al. ................ | 123/276 |
| 6,116,211 A | * | 9/2000 | Suzuki et al. ................ | 123/305 |
| 6,286,477 B1 | * | 9/2001 | Yang et al. .................. | 123/276 |
| 6,341,591 B1 | * | 1/2002 | Tsutsumi et al. ............ | 123/295 |
| 6,363,909 B1 | * | 4/2002 | Tomoda et al. .............. | 123/295 |
| 6,378,486 B1 | * | 4/2002 | Spiegel et al. ............... | 123/298 |
| 6,418,905 B1 | * | 7/2002 | Baudlot et al. .............. | 123/301 |

FOREIGN PATENT DOCUMENTS

JP 2000-034925 2/2000

* cited by examiner

Primary Examiner—John Kwon
(74) Attorney, Agent, or Firm—Armstrong, Westerman & Hattori, LLP

(57) ABSTRACT

In a gasoline direct injection engine, the sloping surface formed on the top of the piston and the opposing roof surface of the cylinder head form mutually different angles with respect to a plane perpendicular to a cylinder axial line so that the intake air caught between the sloping surfaces of the piston and the opposing roof surface is gradually squeezed out of the gap between them, and is prevented from directly flowing into the recess at high speed. As a result, the mixture in the recess is kept at a favorable air/fuel ratio and the engine is enabled to operate in a stratified charge lean burn mode over a wide operating range.

6 Claims, 5 Drawing Sheets

GASOLINE DIRECT INJECTION ENGINE

FIELD OF THE INVENTION

The present invention relates to a gasoline direct injection engine using a piston having a recessed top surface.

DESCRIPTION OF THE RELATED ART

Japanese patent laid open publication No. 2000-34925 discloses a gasoline direct injection engine using a piston having a recessed top surface. In a gasoline direct injection engine, fuel is injected directly into the combustion chamber as opposed to the more conventional fuel injection engine in which fuel is injected into an intake passage leading to the combustion chamber. In this previously proposed gasoline direct injection engine, a raised surface is provided around the recess formed in the top surface of the piston to adjust the compression ratio of the engine, and the pent roof of the combustion chamber and the raised surface are formed as mutually opposing parallel surfaces.

According to this previously proposed structure, as the raised surface of the piston and the roof surface of the combustion chamber come close together toward the end of the compression stroke, because the gap between the raised surface and the roof of the combustion chamber rapidly diminishes in size, the swirl flow of the intake air is forced directly into the recess. As a result, the mixture of a stoichiometric or otherwise prescribed air/fuel ratio formed around the spark plug is blown off, and the stability in the ignition of the mixture is impaired.

SUMMARY OF THE INVENTION

In view of such problems of the prior art, a primary object of the present invention is to provide a gasoline direct injection engine which ensures a stable ignition of the mixture at all times.

A second object of the present invention is to provide a gasoline direct injection engine which can operate under a lean bum condition in a stable manner.

A third object of the present invention is to provide a gasoline direct injection engine which can operate under a lean bum condition and is easy to manufacture.

According to the present invention, these and other objects can be accomplished by providing a gasoline direct injection engine, comprising: a cylinder block defining a cylinder; a piston slidably received in the cylinder and having a top surface defining a reference surface, the top surface including a recess recessed from the reference surface, a raised surface raised from the reference surface formed around the recess, and a sloping surface extending between the raised surface and the reference surface; a cylinder head attached to an end of the cylinder block to define a combustion chamber in the cylinder in cooperation with the piston, the combustion chamber defining a roof surface opposing the sloping surface; a fuel injection valve having a nozzle communicating with the combustion chamber; and a spark plug having an electrode facing the recess; wherein the sloping surface and the roof surface form mutually different angles with respect to a plane perpendicular to a cylinder axial line.

Thus, the intake air caught between the sloping surfaces of the piston and the opposing roof surface is gradually squeezed out of the gap between them, and is prevented from directly flowing into the recess at high speed. As a result, particularly under a low load condition involving a relatively small amount of fuel injection, the mixture in the recess is prevented from being blow away by a high speed swirl flow of the intake air flowing into the recess so that the air/fuel ratio near the spark plug electrode can be maintained at a proper level, and a stable ignition is ensured. In particular, this allows the engine to operate in a stratified charge lean bum mode over a wide operating range. According to a preferred embodiment of the present invention, the combustion chamber consists of a pent roof combustion chamber, and the sloping surface opposes an exhaust side of the roof surface, the sloping surface defining a shallower angle with the respect to the plane perpendicular to the cylinder axial line than the roof surface.

According to a particularly preferred embodiment of the present invention, a swirl shut off wall substantially surrounding the recess is provided between the recess and raised surface. This wall contributes to the prevention of the high speed swirl flow of the intake air directly flowing into the recess. In this case, a notch may be formed in the swirl shut off wall to avoid interference with the spark plug.

Preferably, a spray angle of the fuel injection valve is selected so that fuel injected by the fuel injection nozzle is charged substantially entirely into the recess at least in a stratified charge lean combustion mode. Thus, the injected fuel is substantially entirely charged into the recess so that a favorable air/fuel ratio is ensured for the mixture in the recess and wetting the cylinder surface with gasoline is avoided.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
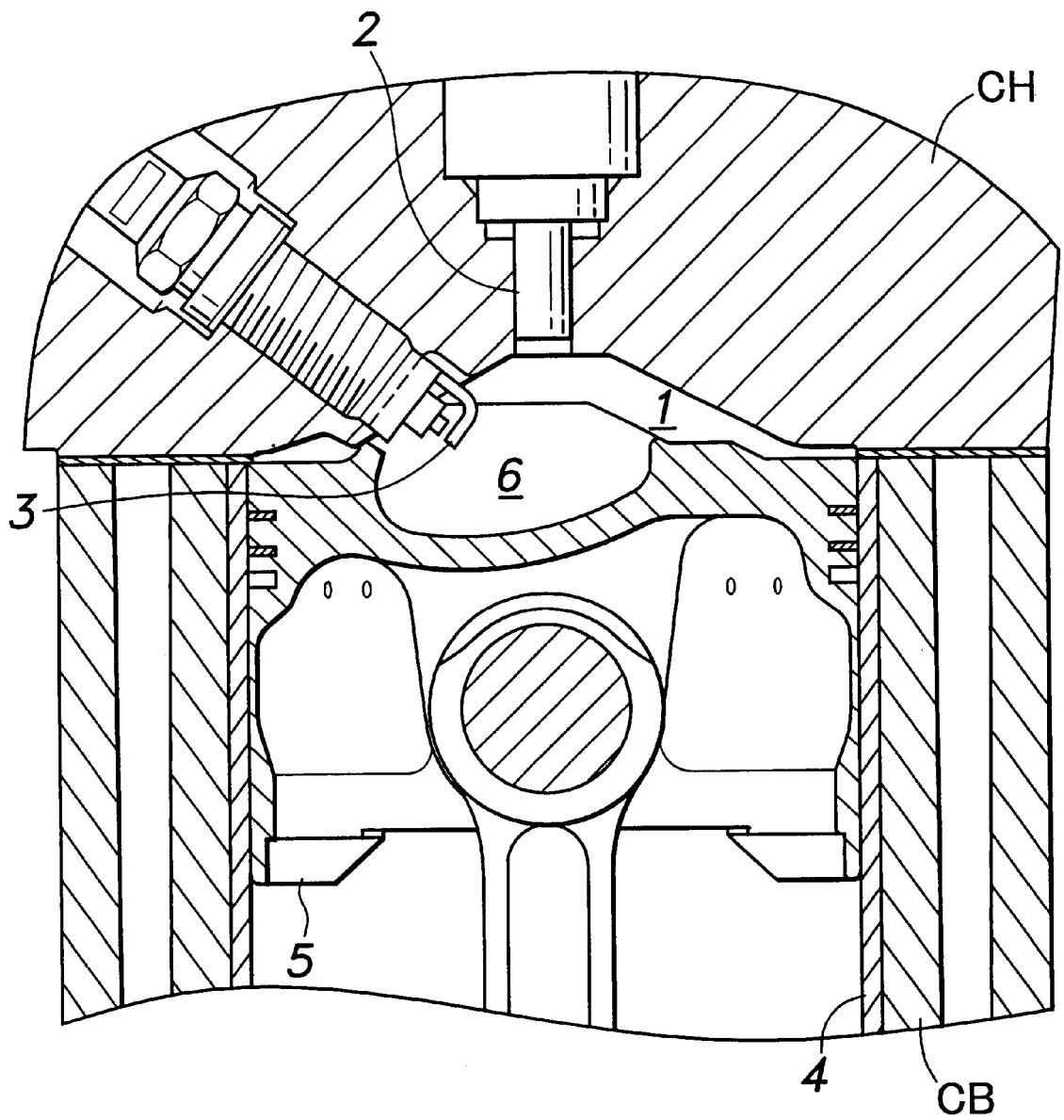
FIG. 1 is a vertical sectional view of the combustion chamber of a direct injection engine embodying the present invention when the piston is at its top dead center.

FIG. 1 shows a pent roof type combustion chamber 1 of a gasoline direct injection engine embodying the present invention. A cylinder 4 is defined in a cylinder block CB, and a cylinder head CH is attached to an axial end of the cylinder block CB. The combustion chamber 1 is defined by the cylinder head CH and a piston 5 slidably received in the cylinder 4, and a nozzle 2 of a fuel injection valve is centrally provided in the roof of the combustion chamber 1 defined by the cylinder head CH. The electrode 3 of a spark plug projects into a part of the combustion chamber 1 interposed between a pair of exhaust ports not shown in the drawing. The exhaust ports are provided with exhaust valves which selectively close the exhaust ports as well known in the art. The central axial line of the nozzle 2 extends substantially in parallel with the cylinder axial line, but is slightly offset toward the electrode 3 of the spark plug.

The top surface of the piston 5 is substantially perpendicular to the cylinder axial line, and is formed with a substantially circular recess 6 having a rounded bottom surface. The volume of this recess 6 is determined so as to be 20 to 30% of the entire volume of the combustion chamber 1 when the piston 5 is at its top dead center position. This engine is designed to achieve a (stratified charge) super lean combustion, and the air/fuel ratio of the mixture in the recess 6 at the ignition timing is controlled to be substantially at the stoichiometric ratio (14.7) so that the ignition of the mixture may be effected in a stable manner by the electrode 3 of the spark plug which faces the interior of the recess 6 at a position offset from the center of the combustion chamber 1 toward the exhaust valves. Because the volume of the air which is present in the combustion chamber outside the recess is two to four times the volume of the recess, a super lean combustion at the air/fuel ratio of 45 to 70 can be achieved.

The recess 6 is also slightly offset from the center of the combustion chamber toward the exhaust valves or the electrode 3 of the spark plug, and the electrode 3 is located fairly close to the center of the recess 6. The location and size of the recess 6 are selected in such a manner that the air/fuel ratio in the central part of the recess 6 is not much different from that of the peripheral part of the recess 6, and a stable ignition and combustion are achieved.

Figure 2:
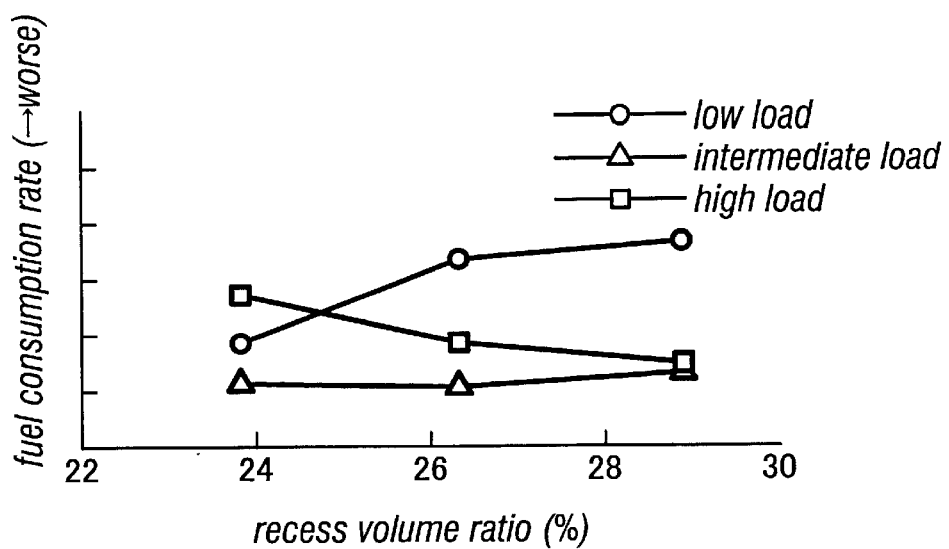
FIG. 2 is a graph showing the relationship between the volume ratio of the recess and fuel consumption rate.

As the volume of the recess 6 is reduced, a relatively large amount of fuel is injected into the recess 6 for the given volume of the recess 6 under a high load condition of the engine so that the air/fuel ratio in the recess 6 gets richer. Conversely, as the volume of the recess 6 is increased, a relatively smaller amount of fuel is injected into the recess for the given volume of the recess 6 under a low load condition of the engine so that the air/fuel ratio gets leaner in the recess 6. In other words, because the volume ratio of the recess 6 that would optimize the fuel consumption rate depends on the engine load as shown in FIG. 2, the gas mileage of the vehicle equipped with this engine can be optimized by selecting the volume ratio of the recess 6 so that the fuel consumption may be optimized under a load condition corresponding to the normal operating condition of the vehicle. In the example shown in FIG. 2, it is fair to say that selecting the volume of the recess 6 to be about 25% of the volume of the combustion chamber 1 produces an optimum result.

Figure 3:
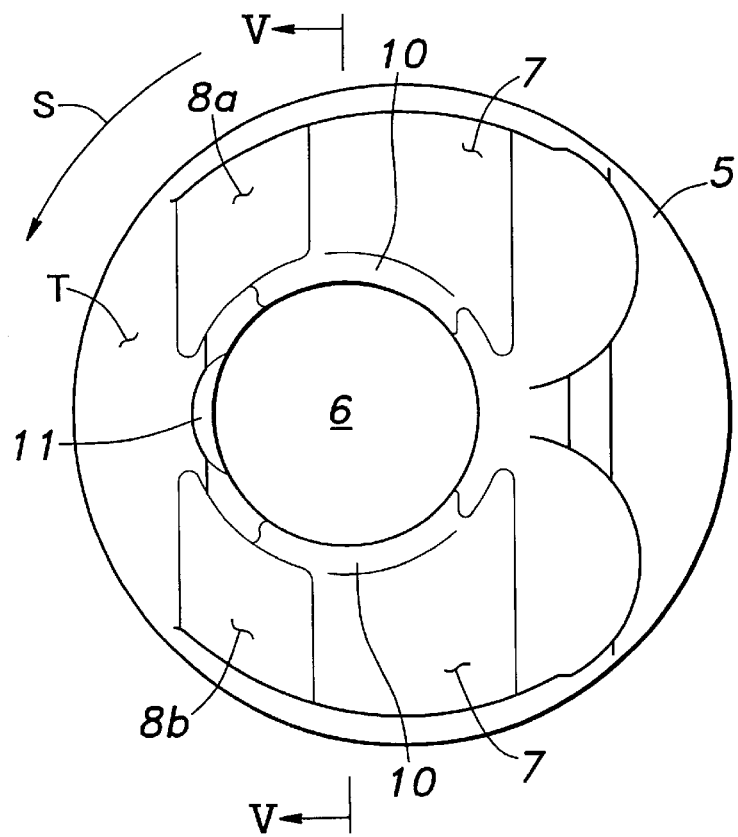
FIG. 3 is a top view of the piston.
Figure 4:
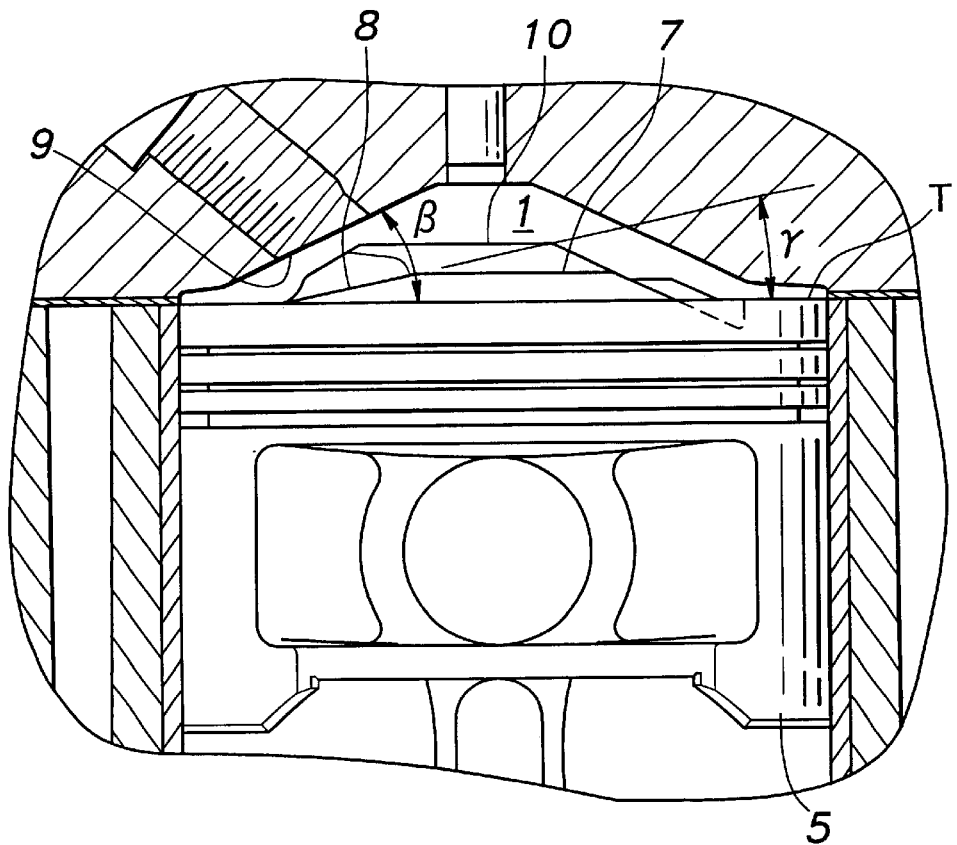
FIG. 4 is a fragmentary vertical sectional view showing the relationship between the combustion chamber and piston top.
Figure 5:
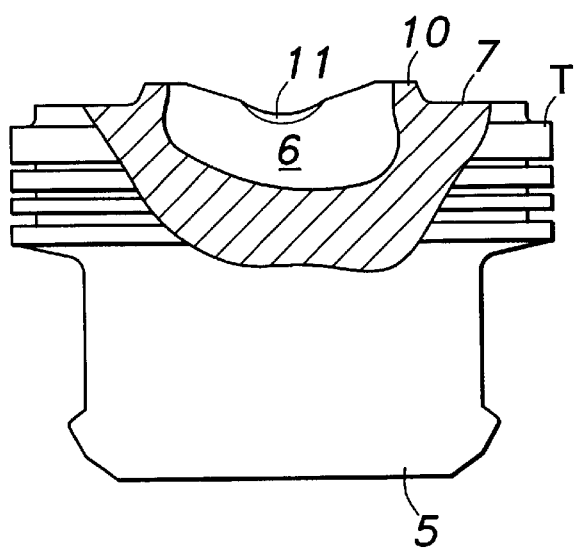
FIG. 5 is a front view of the piston partly in section taken along line V—V of FIG. 4.

The top surface of the piston 5 is also provided with a pair of planar raised surfaces 7 on either side of the recess 6 for controlling the compression ratio as illustrated in FIGS. 3 and 4. In this embodiment, the raised surfaces 7 are substantially in parallel with the reference top surface T of the piston 5. The end of each raised surface 7 facing the exhaust valves is smoothly connected to the top surface (reference surface) T of the piston 5 by a planar sloping surface 8a or 8b. The angle γ which the planar sloping surfaces 8a and 8b forms with respect to the top surface T of the piston 5 or the plane perpendicular to the cylinder axial line is smaller than the angle β of the pent roof surface 9 of the combustion chamber 1 with respect to the piston top surface T (β>γ) as shown in FIG. 5.

A swirl shut off wall 10 is formed substantially over the entire circumference of the recess 6. This swirl shut off wall 10 is higher than the raised surfaces 7 which are located outside the swirl shut off wall 10 by 3 to 5 mm, and has a width in the range of 3 to 8 mm. The swirl shut off wall 10 is provided with a notch 11 so as not to interfere with the electrode 3 of the spark plug when the piston 5 has reached the top dead center position. The spark plug is located between the two exhaust ports.

Suppose that the angle γ of the sloping surfaces 8a and 8b extending from the exhaust port end of the raised surfaces 7 with respect to the top surface of the piston 5 is equal to that β of the pent roof surface 9. Because the gap between the sloping surfaces 8a and 8b and the roof surface 9 rapidly diminishes toward the end of the compression stroke, the swirl flow of the intake air (indicated by arrow S in FIG. 3) in the combustion chamber 1 encounters a significant resistance as it flows through this gap. As a result, the swirl flow flows directly into the recess 6 at high speed via the notch 11 formed in the swirl shut off wall 10. This swirl flow blows away the mixture near the spark plug electrode 3, and prevents the mixture to be ignited and combusted in a reliable manner.

However, according to the present invention, because the sloping surfaces 8a and 8b which are located upstream and downstream of the swirl flow, respectively, with respect to the notch 11 of the swirl shut off wall 10 define a smaller angle than the opposing roof surface 9 of the combustion chamber 1, the intake air caught between the sloping surfaces of the piston 5 and the opposing roof surface 9 is gradually squeezed out of the gap between them, and is prevented from directly flowing into the recess 6 at high speed. As a result, under a low load condition involving a relatively small amount of fuel injection, the air/fuel ratio near the spark plug electrode can be maintained at a proper level, and a stable ignition is ensured.

Under a high load condition involving a relatively large amount of fuel injection, the mixture in the recess 6 is kept at a proper air/fuel ratio, and the fuel mist which overflows from the recess 6 is properly mixed with the surrounding air by virtue of the swirl flow so that the mixture near the spark plug electrode 3 is prevented from becoming too rich. Thus, a stable mode of combustion can be achieved at all times. In particular, the problems such as generation of smoke which result from the mixture in the recess being too rich, respectively, can be favorably avoided.

Figure 6:
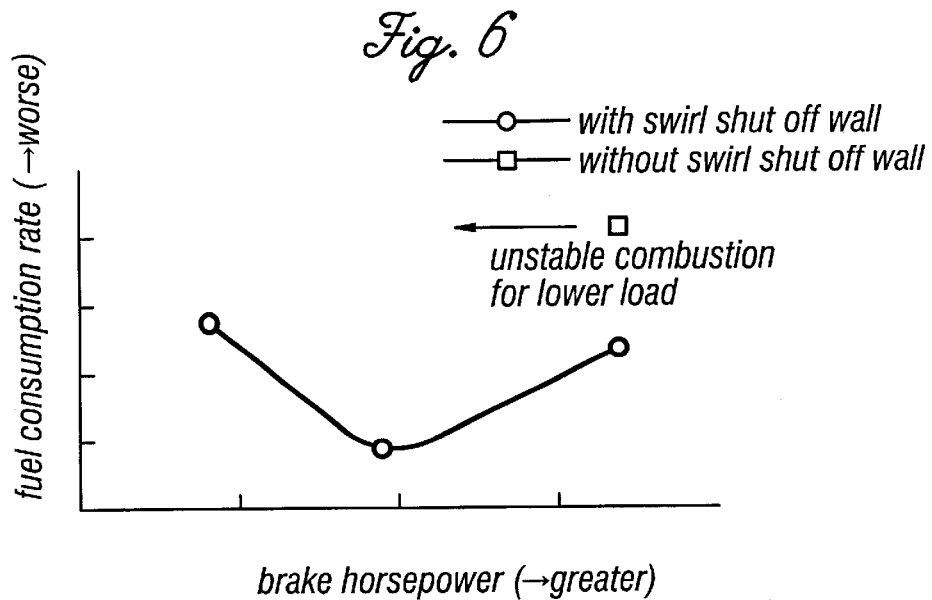
FIG. 6 is a graph showing the relationship between the brake horsepower (engine load) and fuel consumption rate.

The presence of the swirl shut off wall 10 ensures a stable mode of combustion under all conditions and the fuel consumption to be minimized as shown in FIG. 6. If the swirl shut off wall 10 is absent, it becomes impossible to maintain stable combustion particularly when the engine is under a low load condition.

Figure 7:
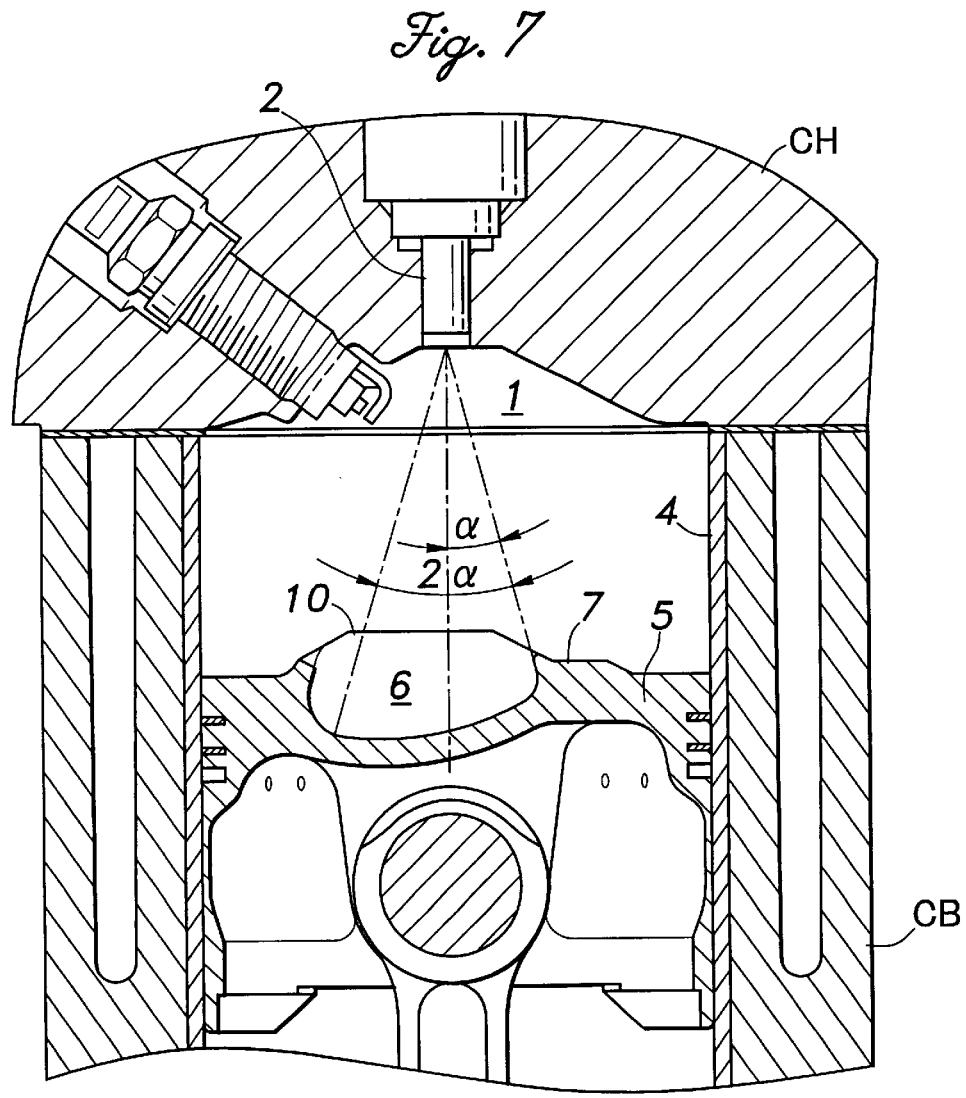
FIG. 7 is a view similar to FIG. 1 at a certain fuel injecting timing.

Typically, the nozzle 2 of a fuel injection valve is designed in such a manner that the fuel is injected into a combustion chamber in the shape of a divergent cone. If the vertex angle of this cone or the spray angle is excessive, part of the sprayed gasoline fails to be charged into the recess 6 in a stratified charge lean combustion mode, and the resulting lean state of the charge in the recess may cause an instability in combustion. If the spray angle gets even greater, gasoline adheres onto the inner surface of the cylinder, and wets the cylinder surface. This not only impairs the emission property but also dilutes the lubricating oil with gasoline Therefore, if the angle formed by the nozzle center line and the line extending from the tip center of the nozzle 2 to the part of the inner periphery of the recess 6 closest to the nozzle (which is located on the side of the recess 6 remote from the exhaust ports) is α when the fuel injection starts, the spray angle should be 2α or smaller at least under a stratified charge lean combustion mode (see FIG. 7). By thus narrowing the spray angle to 2α or less, the injected fuel is substantially entirely charged into the recess 6 so that a favorable emission property can be maintained and the adhesion of gasoline to the inner wall of the cylinder can be avoided under all operating conditions.

Figure 8:
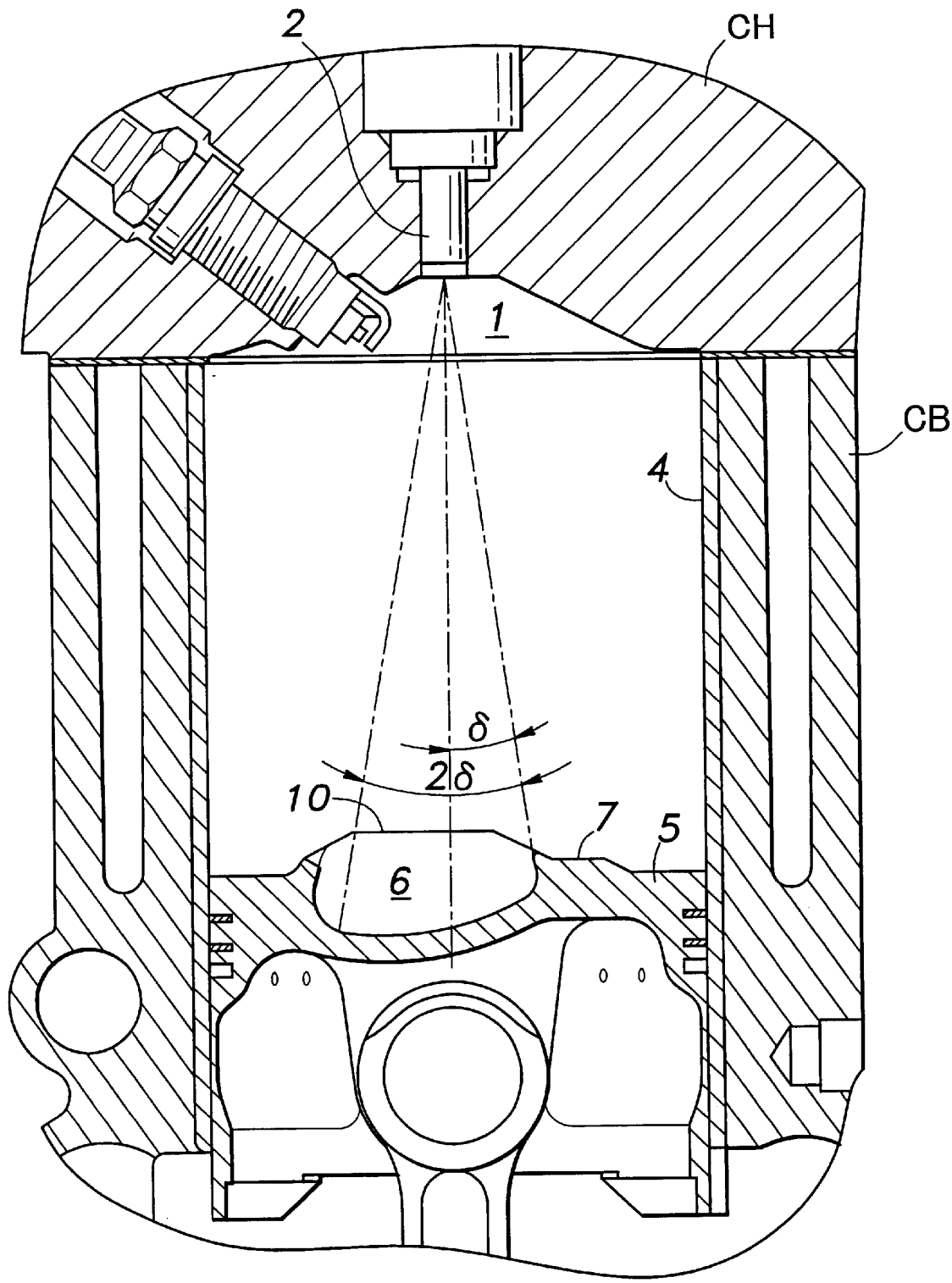
FIG. 8 is a view similar to FIG. 1 when the piston is at its bottom dead center.

Referring to FIG. 8, if the angle formed by the nozzle center line and the line extending from the tip center of the nozzle 2 to the part of the inner periphery of the recess 6 closest to the nozzle (which is located on the side of the recess remote from the exhaust ports) is δ when the piston is at its bottom top center position, the spray angle should be 2δ or smaller at least under a stratified charge lean combustion mode, because the fuel injection starts at a point when the piston is somewhat raised from its bottom dead center in the normal stratified charge lead combustion mode, the injected fuel can be thereby charged substantially entirely into the recess 6 so that a favorable emission property can be maintained and the adhesion of gasoline to the inner wall of the cylinder can be avoided under all operating conditions.

Although the present invention has been described in terms of a preferred embodiment thereof, it is obvious to a person skilled in the art that various alterations and modifications are possible without departing from the scope of the present invention which is set forth in the appended claims.

What is claimed is:

1. A gasoline direct injection engine, comprising:
   a cylinder block defining a cylinder;
   a piston slidably received in said cylinder and having a top surface defining a reference surface, said top surface including a recess recessed from said reference surface, a raised surface raised from said reference surface formed around said recess, and a sloping surface extending between said raised surface and said reference surface;
   a cylinder head attached to an end of said cylinder block to define a combustion chamber in said cylinder in cooperation with said piston, said combustion chamber defining a roof surface opposing said sloping surface;
   a fuel injection valve having a nozzle communicating with said combustion chamber; and
   a spark plug having an electrode facing said recess;
   wherein a first angle formed between said sloping surface and a plane perpendicular to a cylinder axial line is less than a second angle formed between said roof surface and said plane so as to define a progressively widening gap between said roof surface and said sloping surface toward said recess.

2. A gasoline direct injection engine according to claim 1, wherein said combustion chamber consists of a pent roof combustion chamber, and said sloping surface opposes an exhaust side of said roof surface, said sloping surface defining a shallower angle with said respect to the plane perpendicular to the cylinder axial line than said roof surface.

3. A gasoline direct injection engine according to claim 1, further comprising a swirl shut off wall substantially surrounding said recess.

4. A gasoline direct injection engine according to claim 3, wherein a notch is formed in said swirl shut off wall to avoid interference with said spark plug.

5. A gasoline direct injection engine according to claim 1, wherein a spray angle of said fuel injection valve is selected so that fuel injected by said fuel injection nozzle is charged substantially entirely into said recess at least in a stratified charge lean combustion mode.

6. A gasoline direct injection engine according to claim 1, wherein said combustion chamber is provided with a pair of exhaust ports, and said ignition plug is placed between said exhaust ports.

* * * * *